United States Patent [19]

Hirose

[11] Patent Number: 4,835,838
[45] Date of Patent: Jun. 6, 1989

[54] AUTOMATIC TOOL CHANGER IN MACHINE TOOL

[75] Inventor: Noboru Hirose, Nagoya, Japan

[73] Assignee: Brother Kogyo Kabushiki Kaisha, Nagoya, Japan

[21] Appl. No.: 183,992

[22] Filed: Apr. 20, 1988

[30] Foreign Application Priority Data

Apr. 25, 1987 [JP] Japan .................................. 62-102345

[51] Int. Cl.$^4$ ............................................ B23Q 3/157
[52] U.S. Cl. ........................................... 29/568; 408/35
[58] Field of Search .................. 29/568, 26 A; 408/35

[56] References Cited

U.S. PATENT DOCUMENTS

| 3,803,704 | 4/1974 | Seidel | 29/568 |
| 4,309,809 | 1/1982 | Yokoe et al. | 29/568 |
| 4,557,035 | 12/1985 | Rütshcle et al. | 408/35 X |
| 4,679,296 | 7/1987 | Watanabe et al. | 29/568 |

FOREIGN PATENT DOCUMENTS

| 52824 | 6/1982 | European Pat. Off. | 29/568 |
| 2366097 | 6/1978 | France | 29/568 |
| 10981 | 1/1977 | Japan | 29/568 |
| 58-2440 | 5/1983 | Japan . | |
| 44549 | 3/1986 | Japan | 29/568 |
| 117038 | 6/1986 | Japan | 29/568 |

*Primary Examiner*—William Briggs
*Attorney, Agent, or Firm*—Finnegan, Henderson, Farabow, Garrett & Dunner

[57] ABSTRACT

An automatic tool changer in a machine tool for automatically changing a tool. The machine tool includes a main frame, a main spindle head movably provided to the main frame, a main spindle rotatably disposed in the main spindle head, the main spindle head being movable in an axial direction of the main spindle, and a tool magazine provided with a rotatable magazine base for holding a plurality of tool holders and for rotationally indexing one of the tool holders, whereby the one of rotationally indexed tool holder is changed by a tool holder provided at the main spindle. The automatic tool changer comprises; a plurality of tool holder gripping means radially arranged on and pivotably supported to the magazine base, the tool magazine being secured to a stationary portion of the main frame, and means for pivoting one of the tool holder gripping means rotationally indexed independent of remaining tool holder gripping means. The pivoting means moves the one of tool holder gripping means toward and away from the main spindle, and the pivoting means moves the one of tool holder gripping means away from the main spindle when the main spindle head is moved for machining to a workpiece.

9 Claims, 8 Drawing Sheets

AUTOMATIC TOOL CHANGER IN MACHINE TOOL

BACKGROUND OF THE INVENTION

This invention relates to an automatic tool changer in a machine tool, and more particularly, to the automatic tool changer capable of shortening times required for mounting or dismounting a tool holder of the machine tool in which a spindle head is reciprocatingly mounted to a main frame, and a tool magazine accommodating a plurality of grippers for holding the tool holders is rotatably arranged, whereby the tool holders are automatically transferred between the spindle head and the tool magazine in accordance with the reciprocating motion of the spindle head.

There is known a multifunctional machine tool represented, for example, by a machining center (MC) having a construction capable of carrying out various machining works such as thread cutting and drilling works to a workpiece by using a single machine. In the machine tool of this type, a plurality of tools such as tapping tool or drilling tool are provisionally accommodated in predetermined portions of the tool magazine, and an automatic tool changer (ATC) is generally arranged for selecting one of the desired tools in the tool magazine as occasion demands, which is then automatically changed by a used tool mounted in the spindle head. Although various types of the automatic tool changer have been provided in the conventional art of this field, in one practical example, the spindle head is moved in a vertical direction (hereinafter called Z-axis direction) and tools are changed between the spindle head and the tool magazine arranged to be movable in a vertical direction with respect to the spindle head through an operation of a cam mechanism.

For example, the machine tool disclosed in the Japanese Patent Laid-open (KOKAI) Publication No. 60-155338 includes a spindle head provided movably in the Z-axis direction and a rotationally indexable tool magazine provided on a frame of the machine tool to be movable therealong in a vertical direction independently of the movement of the spindle head. According to this construction, when the spindle head moves to a first return direction, a gripper assembled in the tool magazine firmly grips a tool mounted to a tip end of the spindle. The gripped tool is released from the main spindle by a second return movement of the spindle head. Then, the tool is completely separated from the spindle head by a third return movement of the spindle head. The tool magazine is then rotationally index the tool, and thereafter, the spindle head is operated at three times in the manner reverse to that referred to above, thus performing a series of tool charging operation.

According to the automatic tool changer described above, the tool magazine is parallelly moved with respect to the movement of the spindle head in the Z-axis direction during the time ranging between the starting and finishing of the tool changing operations for transferring the tool holder from the spindle head to the tool magazine and for transferring the tool holder from the tool magazine to the spindle head.

According to the automatic tool changer in which the spindle head is reciprocated in the Z-axis direction and the tool magazine is moved parallelly to, but independently from, the movement of the spindle head to carry out the interchange of the tools between the moving spindle head and the moving tool magazine, the tool magazine is vertically moved in its entirety during the tool changing operation. The tool magazine is however equipped with a plurality of grippers in radial arrangement each detachably holding the tool holder. The weight of the entire tool magazine is thus considerably heavy. Therefore, large inertia moment will occur due to the self-weight of the tool magazine when the tool magazine is moved vertically at high speed for the quick transfer of the tools. Accordingly, a considerably large mechanical shock will be imparted at a time when the spindle abuts the gripper through the tool holder.

In order to alleviate such mechanical shock, in a conventional technique, the moving speed of the spindle head in the Z-axis direction is decreased to surpress the inertia moment caused by the mass of the tool magazine. However, the decrease in moving speed of the spindle head for the purpose of alleviating the mechanical shock, in spite of the fact that the spindle head inherently has a capacity of moving at a sufficiently high speed, requires inevitable unnecessary time for changing the tool. This fact constitutes a counter tendency to the present situation at which frequent tool changing operations are required with possibly shortened tool changing time for producing reduced numbers of productions yet having various kinds.

There are related inventions described in U.S. Pat. No. 4,679,296, Japanese Patent Publication No. 58-24220 and copending U.S. patent application Ser. No. 8,654 filed on Jan. 30, 1987.

SUMMARY OF THE INVENTION

Accordingly, an object of this invention is to substantially eliminate the defects or drawbacks encountered to the conventional automatic tool changer of a machine tool and to provide an improved automatic tool changer in a machine tool capable of shortening the tool changing operation time.

Another object of this invention is to provide such automatic tool changer in a machine tool provided with a plurality of gripping means for gripping tool holders to be independently movable in the tool changing operation thereby minimumly reducing the weight of the movable parts or members associated for the tool changing operation.

Still another object of this invention is to provide a machine tool having an automatic tool changer capable of avoiding the generation of large inertia moment of a tool magazine even in the high speed reciprocating motion of the spindle head thereby substantially reducing mechanical shock in the operative engagement of the spindle with the tool holder gripping means.

These and other objects can be achieved according to this invention by providing an automatic tool changer provided with a plurality of tool holder gripping means and means for pivotting one of the tool holder gripping means which is rotationally indexed in a machine tool for automatically changing tools. The machine tool includes a main frame, a main spindle head movably provided to the main frame, a main spindle rotatably disposed in the main spindle head, the main spindle head being movable in an axial direction of the main spindle, and a tool magazine provided with a rotatable magazine base for holding a plurality of tool holders and for rotationally indexing one of the tool holders, whereby the one of rotationally indexed tool holder is changed by a tool holder provided at the main spindle. The automatic tool changer comprises; a plurality of tool holder gripping means radially arranged on and pivotably supported to the magazine base, the tool magazine being secured to a stationary portion of the main frame, and means for pivotting one of the tool holder gripping means rotationally indexed independent of remaining tool holder gripping means. The pivotting means moves the one of tool holder gripping means toward and away from the main spindle, and the pivotting means moves the one of tool holder gripping means away from the main spindle when the main spindle head is moved for machining to a workpiece.

The details of the preferred embodiment of the automatic tool changer in the machine tool for changing tools and for machining a workpiece with a selected tool will be described hereinafter with reference to the accompanying drawings.

DESCRIPTION OF THE PREFERRED EMBODIMENTS

The automatic tool changer (ATC) in a machine tool according to this invention will be described hereinafter with respect to the respective constructional parts, elements or members in conjunction with the accompanying drawings.

[Spindle Head and Tool Magazine]

Figure 1:
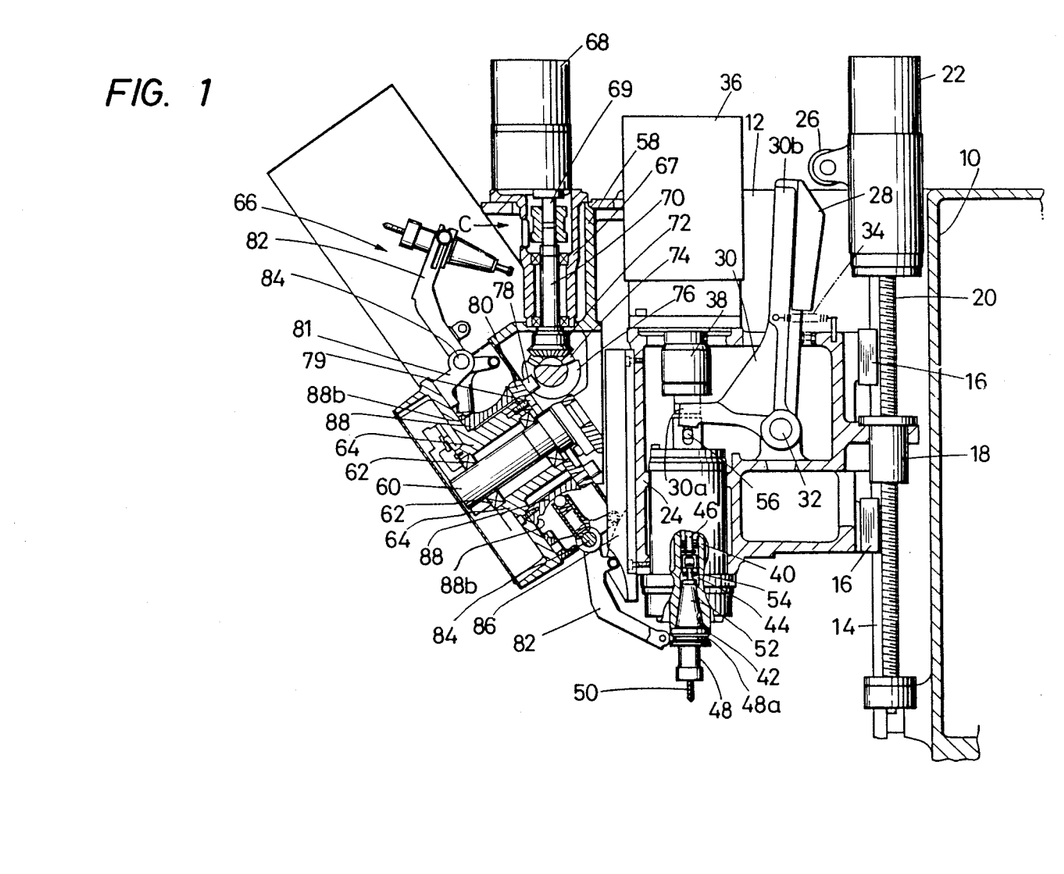
FIG. 1 is a vertical cross-sectional view of a preferred embodiment of an automatic tool changer of a machine tool according to this invention.

A machine tool shown in FIG. 1 including an automatic tool changer is generally provided with a vertically extending column 10, a main frame 12 fixedly secured to the column 10, a main spindle head 24 and a tool magazine 66. The main spindle head 24 is provided to the main frame 12 and is movable in the vertical, i.e. Z-axis, direction in a reciprocative manner with respect to a main frame 12. The tool magazine 66 is operatively connected to the main frame 12 through a magazine support stand 58 and is adapted to index tool holders 48 accommodated in the tool magazine. A guide rail 14 secured to the frame 12 extends vertically therealong, and the spindle head 24 is secured to the guide rail 14 and is slidable thereon in the Z-axis direction through a pair of slidable pieces 16 arranged in a vertical alignment. A nut 18 is secured at a proper position to the spindle head 24, and a ball screw 20 is rotatabley provided about its axis and extends in parallelism with the guide rail 14. The nut 18 is threadingly engaged with the rotatable ball screw 20. The ball screw 20 has one end connected to a reversible servo motor 22, and is driven by the reversible servo-motor 22 disposed above the machine frame 12, whereby the spindle head 24 is movable vertically along the guide rail 14 by the engagement between the ball screw 20 and the nut 18.

A spindle 40 extending in vertical direction is rotatably mounted in the spindle head 24, and a tool holding member 24 is provided at the lower end portion of the spindle 40. The spindle 40 is connected, through a coupling 38, to an electric motor 36 for driving the spindle 40. The tool holding mermber 42 has the shape to allow an arbor 52 of the tool holder 48 to be inserted thereinto. The tool holder 48 has its tip portion mounting a tool 50. When the tool holder 48 is inserted into the tool holding member 42, a pull stud 54 of the tool holder 48 is clamped by a holder clamping member 44 disposed in the spindle 40. The clamping of the pull stud 54 is released by pressing the holder clamping member 44 with a draw-bar 46 coaxially disposed in the central hole of the spindle 40, thereby to remove the tool holder 48 from the spindle 40.

[Tool Holder Clamping and Releasing Mechanism]

A crank lever and a cam mechanism for imparting the swingable movement to the crank lever are incorporated in the automatic tool changer in association with the spindle 40 for clamping the tool holder 48 inserted into the tool holding member 42 and for unclamping the same. To be more specific, a crank lever 30 is swingably pivoted to the spindle head 24 at a proper portion thereof through a pivot shaft 32. The crank lever 30 comprises a short lever member 30a and an elongated lever member 30b. The short lever has a free end engageable with a pin 56 projecting from the draw bar 46 and extending in a direction perpendicular thereto. The long lever member 30b is provided with a plate cam 28 having a shape shown in FIG. 1.

The plate cam 28 is normally engageable with a cam follower 26 mounted on the servo-motor 22 during movement of the cam 28. Further, a tension coil spring 34 is interposed between the long lever member 30b and the spindle head 24 so as to always urge the short lever member 30a to a direction away from the pin 56, so that the pin 56 can be released from the pressing force by the lever member 30 (the spring 34 urges the crank lever 30 in a clockwise direction in FIG. 1).

Upon energization of the servo-motor 22, the spindle head 24 is elevated, and on the way of the vertical movement of the spindle head 24, the plate cam 28 attached to the crank lever 30 is engaged with the cam follower 26 located at the stationary position. As a result, the crank lever 30 is pivotted in a direction opposite the urging direction of the coil spring 34, so that the short lever 30a moves downwardly to press the pin 56, and thus, the tool holder clamping member 44 is urged through the draw bar 46, and then the clamping force of the tool holder 48 against the pull stud 54 can be released.

[Rotationally Indexable Mechanism in Tool Magazine]

As shown in FIG. 1, a support shaft 60 is secured to the tool magazine support stand 58 secured to the machine frame 12. The support shaft 60 is oriented obliquely downwardly and is positioned adjacent to a spindle head movable zone, A magazine base 64 having a configuration as shown is provided rotatable about the support shaft 60 through bearing means 62. Further, a plurality of grip arms 82 (ten arms in the illustrated embodiment) serving as tool holder holding means, described in detail hereinafter are arranged in radial directions with predetermined angular positions and are provided pivotable with respect to the magazine base 64. An indexing disc 80 is fixed to the magazine base 64 by bolts 79. The disc 80 is formed with a central bore fitted with the support shaft 60. A plurality of cam followers 78 (ten followers in the illustrated embodiment) each in a roller form are disposed on one face of the indexing disc 80 at portions corresponding to the location of grip arms 82 described in detail hereinafter.

Figure 6:
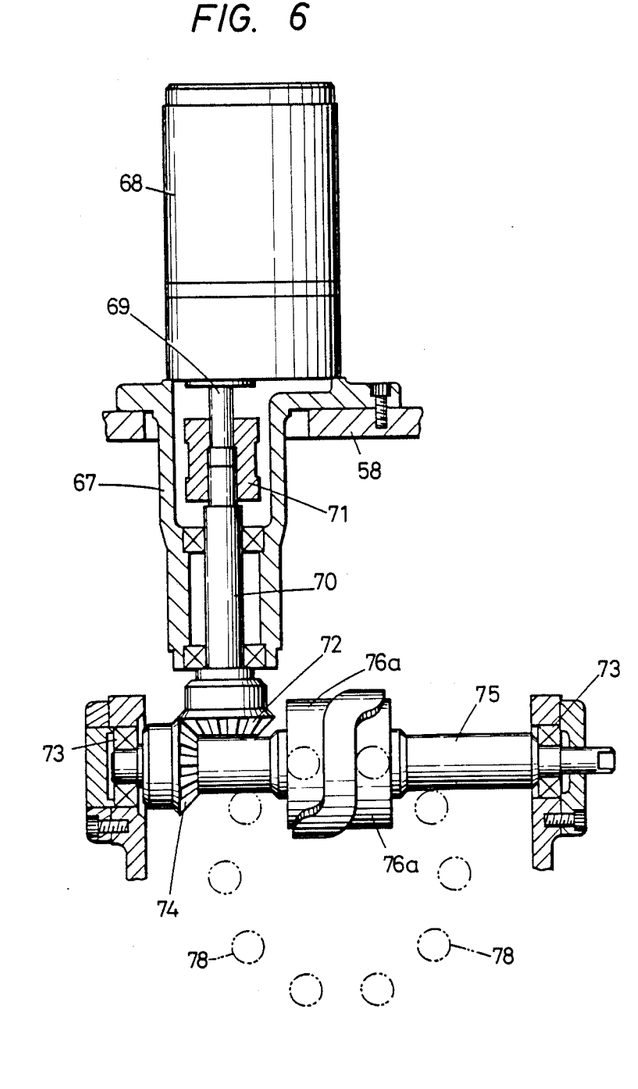
FIG. 6 is a view showing a tool magazine indexing mechanism associated with the automatic tool changer shown in FIG. 1 as viewed from an arrow C in FIG. 1.

As shown in FIG. 1 and FIG. 6 viewed from an arrow C direction in FIG. 1, an indexing motor 68 is inversely disposed on an upper portion of a casing 67 which vertically extends on the magazine support stand 58. A drive shaft 70 extends through the casing 67, and has one end connected to a motor shaft 69, and has another end fixed with a bevel gear 72. The bevel gear 72 is in meshing engagement with a bevel gear 74 provided at a rotating shaft 75 horizontally extending through bearing means 73 to impart the rotation in the predetermined direction to the rotating shaft 75. A barrel cam 76 formed with a curved cam groove 76a on its outer peripheral surface is mounted on the rotating shaft 75, so that the cam followers 78 radially arranged on the indexing disc 80 are successively fitted with the cam groove 76a, when operated, thereby to impart the intermittent indexing rotation to the indexing disc 80 in response to the rotation of the barrel cam 76 about the support shaft 60.

[Tool Holder Gripping Mechanism]

Figure 2:
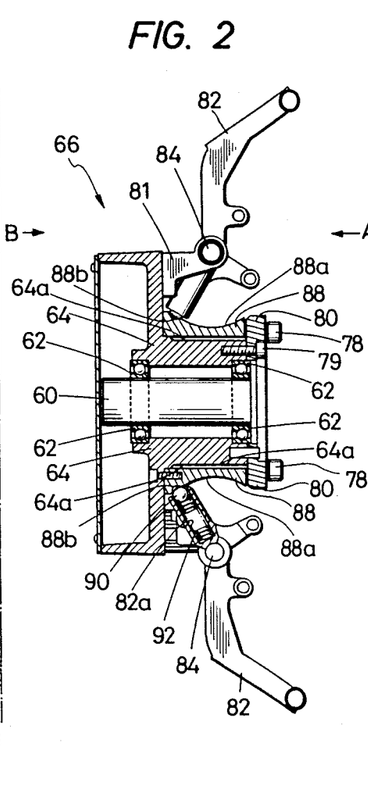
FIG. 2 is a vertical cross-sectional view showing an essential portion in a tool magazine of the machine tool shown in FIG. 1.
Figure 3:
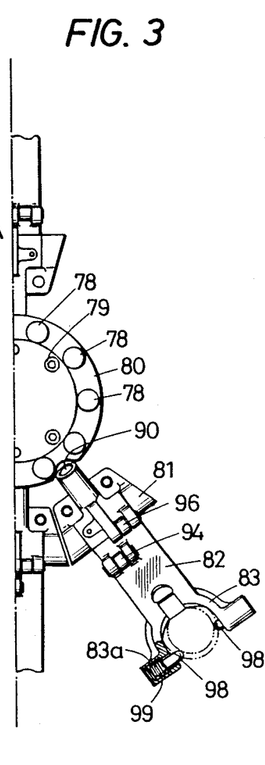
FIG. 3 is a view of the tool magazine viewed from an arrow A in FIG. 2.
Figure 4:
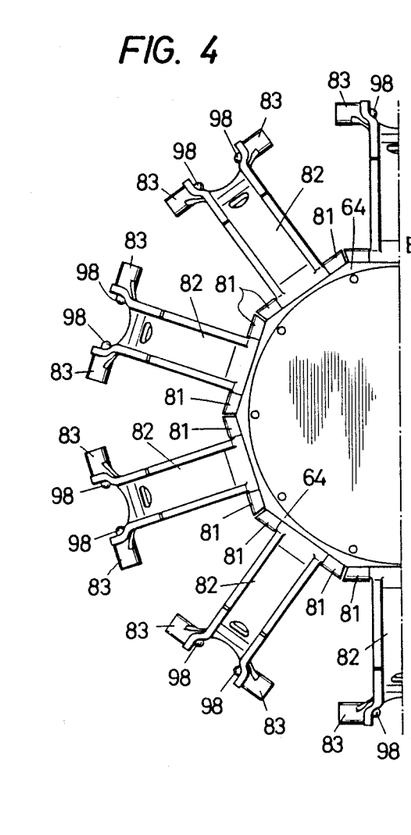
FIG. 4 is a view of the tool magazine viewed from an arrow B in FIG. 2.

A tool holder gripping mechanism to be indexed by the rotationally indexing mechanism and a swingable mechanism for carrying out the swingable movement of the tool holder gripping mechanism for transmitting the tool holder 48 are described hereunder with reference to FIGS. 2 to 4.

A plurality of clevises 81 (ten crevise in the illustrated embodiment) are provided on the magazine base 64, which constitutes one of the components of the tool magazine 64, in the circumferential directions, with respect to the support shaft 60, at predetermined spaces from each other. The respective celvises 81 swingably pivot the grip arms 82, each having a configuration as shown, through pivot pins 84, respectively, so as to direct the free ends of the grip arms 82 radially outwardly. Each of the free ends of the grip arm 82 is, as best shown in FIG. 3, provided with a bifurcated portion 83 having dimensions capable of holding the maximum diameter portion of the tool holder 48. Blind bores 83a are formed in the inner portions of the respective bifurcated portion 83. The bores 83a extend in a direction normal to a base body of the grip arm 82, and compression coil springs 99 are accommodated in the respective blind bores 83a. Further, support pins 98 are retractably inserted into the bores 83a, so that the front free ends of the pins 98 direct inwardly of the bifurcated portion 83 to oppose to each other in a linearly aligned manner.

When the maximum diameter portion of the tool holder 48 is fitted with the bifurcated portion 83a of the grip arm 82, the support pins 98 abut against the V-shaped groove 48a formed at the maximum diameter portion. The tool holder 48 is supported by the support pins 98 which are retracted into the blind holes 83a against the biasing force of the coil springs 99.

The grip arm 82 has another end portion in which is formed another blind bore 82a in which a compression coil spring 92 and a steel ball 90 are resiliently accommodated in a state that a portion of the steel ball projects out of an open end of the blind bore 82a. As shown in FIG. 2, the magazine base 64 is provided with a boss 64a on which a grip support collar 88 is mounted. The grip support collar 88 has an outer peripheral surface at which a guide surface 88a having an arcuate cross-section is provided. The steel ball 90 disposed in the blind bore 82a of the grip arm 82 resiliently abuts against the arcuate guide surface 88a. A notch groove 88b is formed in the guide surface 88a on the side near the magazine base 64. The grip arm 82 is settled at its stand-by position for the tool indexing operation by fitting the steel ball 90 into the notch groove 88b.

Figure 5:
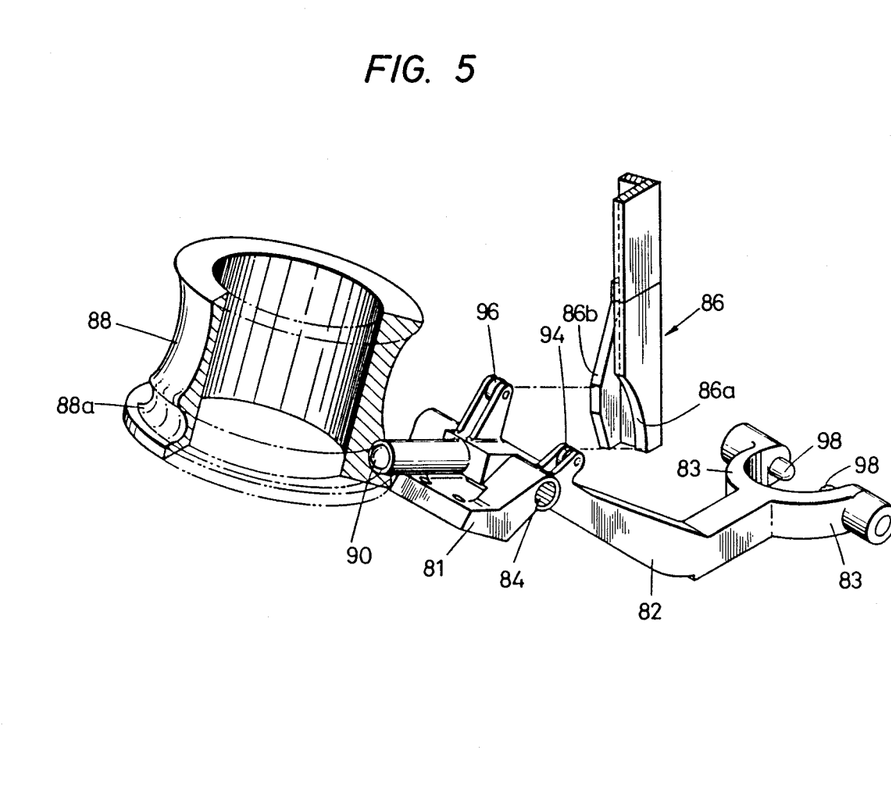
FIG. 5 is a perspective exploded view showing a tool holder grip arm and associated members of the automatic tool changer shown in FIG. 1.

As shown in FIGS. 4 and 5, first and second cam followers 94 and 96 each in roller shape are supported to be rotatable at bilateral locations with respect to the center line of the grip arm 82, and at the longitudinally front and rear portions of the grip arm 82 with respect to the pivot pin 84. The first and second cam followers 94 and 96 are constructed so as to slidably abut against and move away from the first and second cam surfaces 86a and 86b formed in a composite cam member 86 shown in FIGS. 1 and 5. More specifically, as shown in FIG. 1, the composite cam member 86 is secured by bolts to the vertical surface of the spindle head 24, and confronts the tool magazine 66, so that the first and second cam surfaces 86a and 86b are in confrontation with the side of the indexing position of the desired tool holder 48 in the tool magazine 66 (i.e. these cam surfaces are positioned near the grip arm 82 indexed correspondingly to the tool holding member 42 of the spindle 40).

The first and second cam followers 94 and 96 those provided at the grip arm 82 are positioned so as to slide contact with the first and second cam surfaces 86a and 86b of the composite cam plate 86 respectivrely correspondingly in the vertically movable area of the spindle head 24, which area includes a vertically original point Z as will be descibed hereinafter with reference to FIGS. 7(a) to 7(d), FIGS. 7(g) to 7(i) and FIG. 8. When the spindle head 24 is moved vertically in the Z-axis direction, the first and second cam followers 94 and 96 are brought into abutment with the first and second cam surfaces 86a and 86b, respectively, under the condition described later, whereby the grip arm 82 can be swingably moved in the predetermined manner about the pivot pin 84 in accordance with the curvatures of the cam surfaces 86a and 86b. In this state, the steel ball 90 disposed in the another end of the grip arm 82 is disengaged from the notched groove 88b circumferentially formed on the grip support collar 88, and is moved along the arcuate guide surface 88a.

Figure 7A:
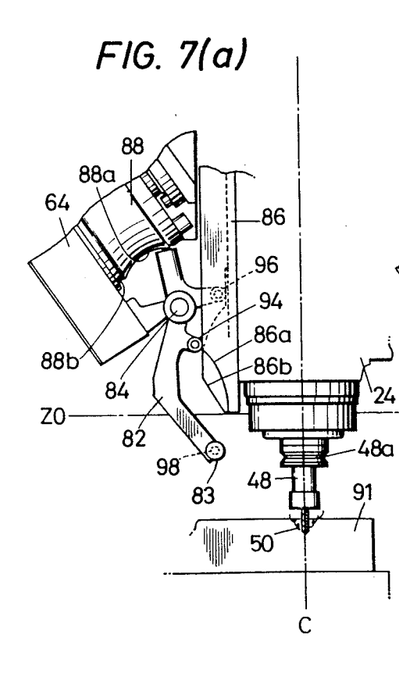
FIGS. 7(a) through 7(i) are sequential views illustrative of the tool changing operation and show positional relationship among a spindle head movable in the Z-axis direction, a tool magazine arranged at stationary position, and a grip arm provided at a tool magazine for indexing the tool holder to be utilized.
Figure 7B:
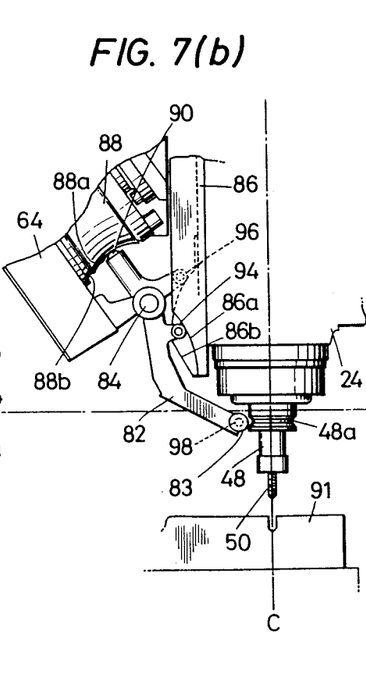
Figure 7C:
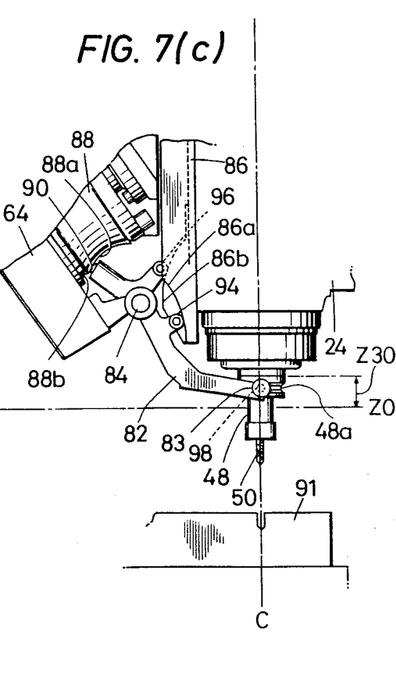
Figure 7D:
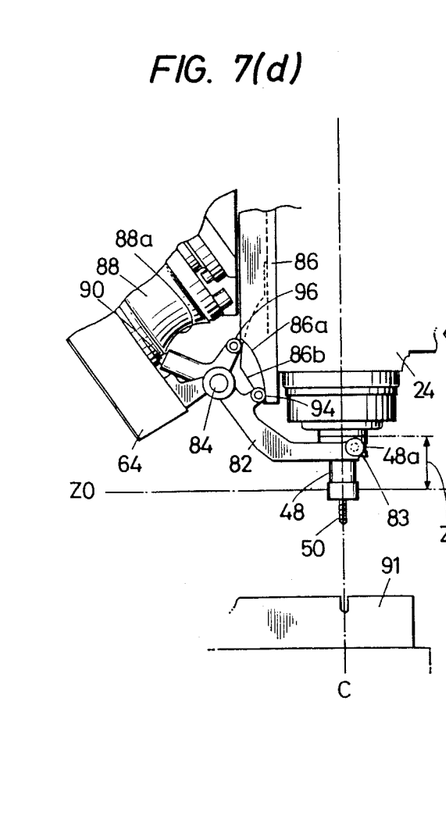
Figure 7E:
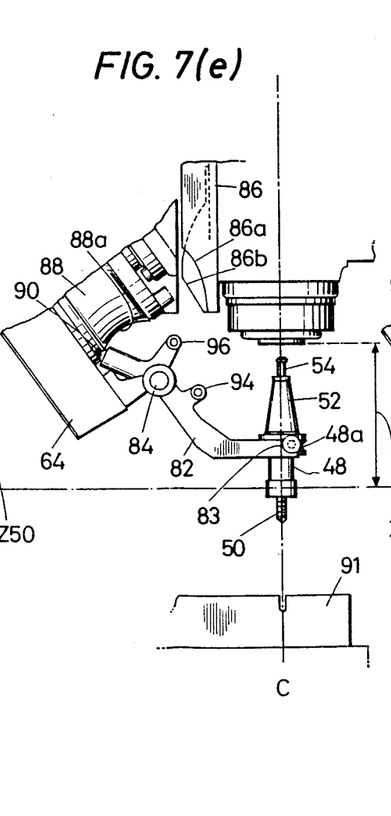
Figure 7F:
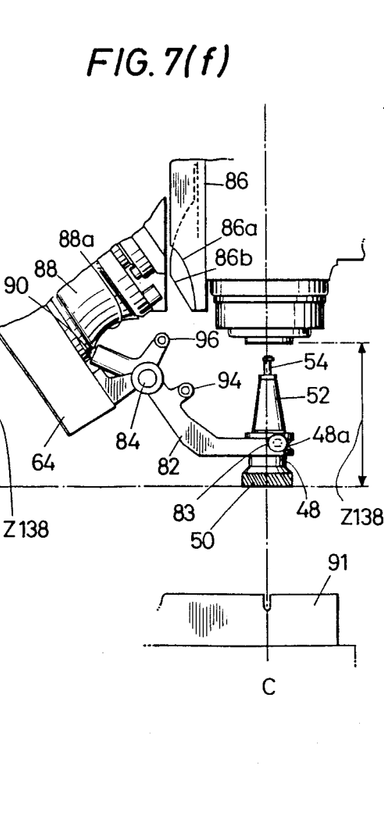
Figures 7G, 7H:
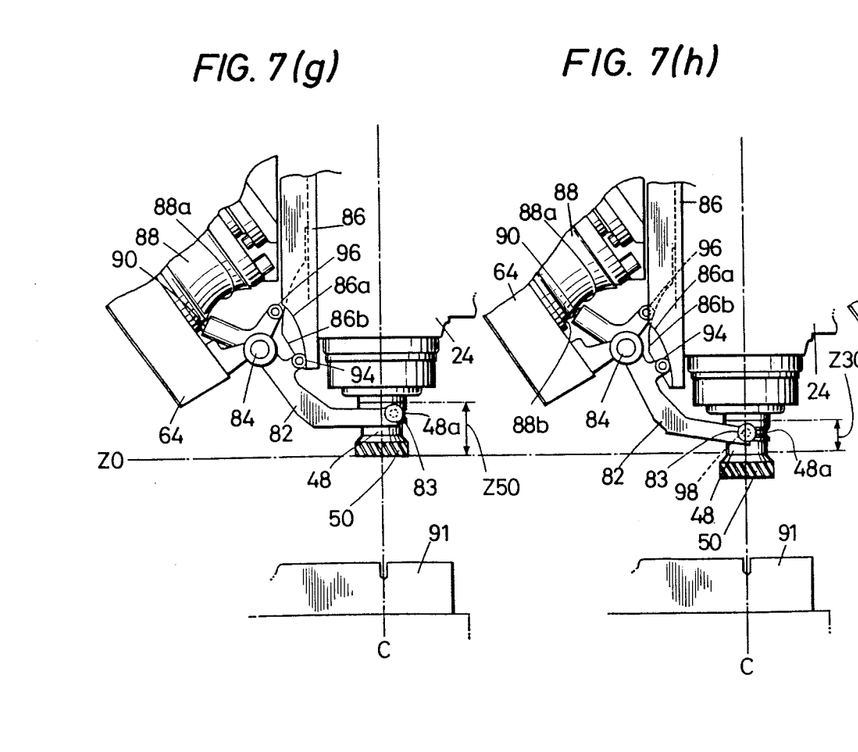
Figure 7I:
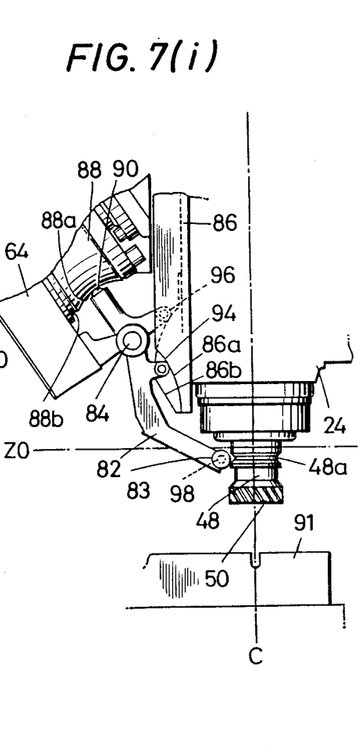

The preferred embodiment of the automatic tool changer having construction described above will be operated in accordance with a manner illustrated in FIGS. 7(a) and 7(i).

The spindle head 24 and the composite cam member 86 fixed thereto are moved vertically in the Z-axis direction because of the thread-engagement between the nut 18 secured to the spindle head 24 and the rotating ball screw 20 by the rotation of the servo-motor 22. However, the vertical position of the tool magazine 66 is unchanged, and the magazine 66 is positioned at a predetermined portion of the main frame 12, while the magazine base 64 in the tool magazine 66 is rotated by the rotation of the indexing motor 68 to index the tool holders 48 held by the respective grip arms 82.

Figure 8:
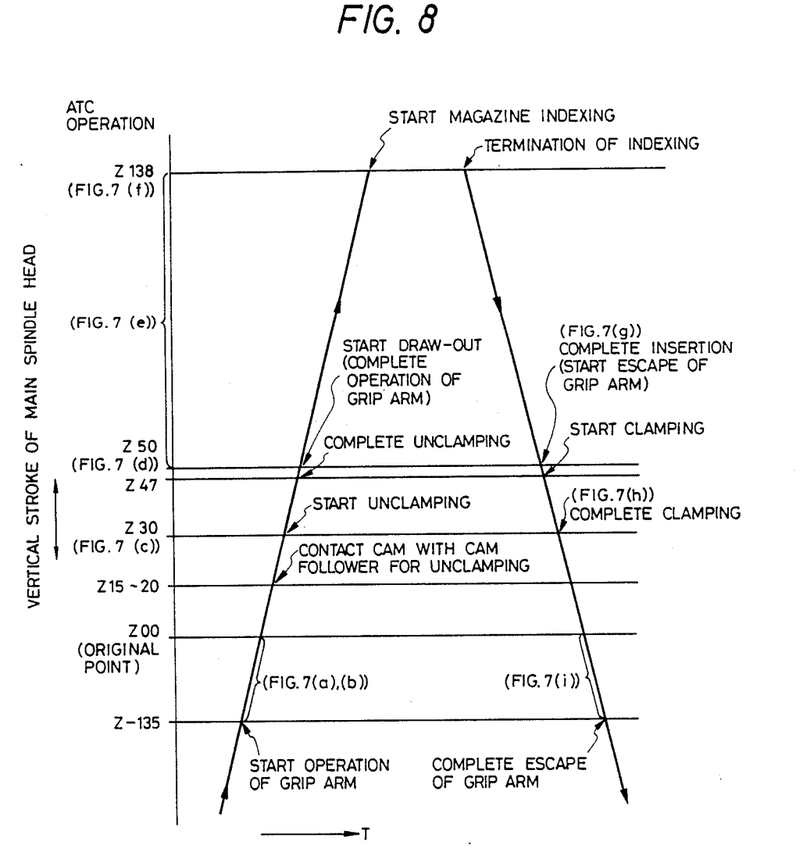
FIG. 8 shows a time chart illustrative of the operations of the respective members in accordance with the movement of the spindle head in the elapsed time.

Accordingly, in the states of the automatic tool changer shown in FIGS. 7(a) to 7(i), a Z-point as the reference operation level of the spindle head 24 is defined. FIG. 8 shows a time chart representing the operations of the respective components of the automatic tool changer in connection with the illustrated states in FIGS. 7(a) to 7(i).

FIG. 7(a) shows a conditions of a machine tool according to this invention where the workpiece 91 is subjected to machining. In this state, the lower open end of the spindle 40 of the spindle head 24 is positioned at a position lower than the Z point. In this case, the first cam follower 94 provided at the grip arm 82 is positioned at the uppermost portion of the corresponding first cam surface 86a of the composite cam member 86, while the second cam follower 96 is positioned at the lowermost portion of the corresponding second cam surface 86b, thus maintaining the bifurcated portion 83 of the grip arm 82 at the maximumly leftward position in which the bifurcated portion 83 is positioned spaces far apart from the specified tool holder 48 mounted in the tool holding member 42 of the spindle 40. According to this positional arrangement, the spindle head 24 is solely movable to its descent position towards the workpiece 91 to carry out the predetermined cutting operation.

FIG. 7(b) represents the condition in which the spindle head 24 is moved upwardly to a portion at which the lower open end of the spindle 40 is positioned at substantially the same level as the level of the Z point. In this condition, the orientation (i.e. positioning in the rotating direction) of the spindle 40 has been terminated, and the first cam follower 94 of the grip arm 82 is positioned at the intermediate portion of the first cam surface 86a while the second cam follower 96 is positioned at the intermediate portion of the second cam surface 86b to move the longer arm 82 toward the tool holder 48, thereby to slightly swing the grip arm 82 about the pivot pin 84 in the counterclockwise direction in FIG. 7. Therefore, the paired support pins 98, as shown in FIG. 3, provided in the bifurcated portion 83 of the grip arm 82 are closely positioned adjacent the V-shaped proove 48a orienting in a horizontal direction and circumferentially formed in the maximum diameter portion of the tool holder 48. At this time, the support pins 98 have not yet engaged with the V-shaped groove 48a, thus capable of carrying out the cutting operation to the workpiece 91 by the tool 50. The first and second cam surfaces 86a and 86b are so designed that the support pins 98 can follow up the vertical displacement of the V-shaped groove 48a of the tool holder 48 up to the time when the tool gripping operation has been completed as represented by the condition of FIG. 7(d).

FIG. 7(c) shows the next step in which the spindle head 24 is elevated by the distance, for example, designated by reference numeral Z30 above the reference point Z for changing the tool holder 48. During the elevating motion of the spindle head 24 to this level, the plate cam 28 of the crank lever 30 comes into contact to and engages with the cam follower 26, and the crank lever 30 starts to be rotated in counterclockwise direction in FIG. 1 against the biasing force of the tension coil spring 34. Further, the first and second cam surfaces 86a and 86b of the composite cam member 86 urge the corresponding first and second cam followers 94 and 96 respectively in accordance with the elevating motion of the spindle head 24 over the level of the reference point Z, so that the grip arm 82 is further pivotted in the counterclockwise direction. Under this condition, the support pins 98 of the bifurcated portion 83 of the grip arm 82 are aligned with the V-shaped groove 48a of the tool holder 48 and moved in the follow-up manner, and the support pins 98 are then retracted against the biasing force of the springs 99 and are positioned on the center line C of the spindle 40. At this time, the short lever member 30a of the crank lever 30 starts to press the pin 56 of the draw bar 46 downwardly, and to release the clamping of the holder clamping member 44 with respect to the pull stud 54 of the tool holder 48.

In the next step, FIG. 7(d) shows the state in which the spindle head 24 is elevated by the distance designated by reference numeral Z50. As is apparent from the time chart shown in FIG. 8, just before arriving at this elevated condition, the crank lever 30 has been completely swung, and the holder clamping member 44 releases the pull stud 54, thus finishing the unclamped condition of the tool holder 48. The grip arm 82 is further swung in the counterclockwise direction (FIG. 7) under the engagement between the first and second cam surfaces 86a and 86b and the corresponding first and second cam followers 94 and 96, whereby the steel ball 90 in the grip arm 82 is stably rested in the notched groove 88b of the grip support collar 88. Under this condition, the support pins 98 completely hold the V-shaped groove 48a of the tool holder 48, thus chucking the tool holder 48 by means of the grip arm 82.

Under this condition, the draw-out of the tool holder 48 from the spindle head 24 is started. That is, the spindle head 24 is further elevated over the position shown in FIG. 7(d), and for example, elevated to a position apart from the level point Z by the distance designated by the reference numeral Z138 as shown in FIG. 7(e). In this state, the cam followers 94 and 96 are spaced away from the cam surfaces 86a and 86b. The tool holder 48 used for cutting the workpiece 91 remains intact in the grip arm 82 under the clamped condition and the tool holder draw-out operation has been completed, that is, the tool holder 48 is completely transferred from the spindle head 24 to the tool magazine 66. Under these conditions, the indexing motor 68 referred with respect to FIGS. 1 and 6 is driven to rotatingly index the indexing disc 80 under the operative engagement between the barrel cam 76 and the cam follower 78. Accordingly another grip arm 82 holding another tool holder 48A to be used for the next cutting working is positioned directly below the tool holding member 42 of the spindle head 24 where the new tool holder 48A is brought into alignment with the center line C as shown in FIG. 7(f).

Next, described will be the newly indexed tool holder 48A engageable with the tool holding member 42 of the spindle head 24. The spindle head 24 is lowered from the position designated by Z138 in FIG. 7(f) to the position designated by Z50 in FIG. 7(g) because of the engagement of the ball screw 20 with the nut 18 secured to the spindle head 24 upon reverse rotation of the servo-motor 22. According to the lowering of the spindle head 24, the arbor 52 of the newly indexed tool holder 48A is inserted into the tool holder holding member 42. The first and second cam followers 94 and 96 are spaces away from the corresponding first and second cam surfaces 86a and 86b of the composite cam member 86 in the states shown in FIGS. 7(e) and 7(f). However, the cam followers 94 and 96 are again comming into contact with the corresponding cam surfaces 86a and 86b respectively to start the escape movement of the grip arm 82 relative to the tool holder 48A. That is, the grip arm 82 starts pivotal movement about the pivot pin 84 in the clockwise direction (FIG. 7), and the pins 98 in the bifurcated portion 83 of the grip arm 82 follow up the movement of the V-shaped groove 48a formed circumferentially in the tool holder 48A.

When the spindle head 24 is lowered to the distance designated by the reference number Z47 as shown in FIG. 8, the plate cam 28 in engagement with the cam follower 26 for swinging the crank lever 30 in the counterclockwise direction (FIG. 1) begins to move away from the cam follower 26 for clamping the pull stud 54 of the tool holder 48 by means of the holder clamping member 44.

As shown in FIG. 7(h), when the spindle head 24 is further lowered near to the position designated by Z30, the plate cam 28 of the crank lever 30 is completely disengaged from the cam follower 26, so that the clamping operation of the holder clamping member 44 with respect to the pull stud 54 has been completed. Further, the steel ball 90 located in the tip end portion of the grip arm 82 is disengaged from the notched groove 88b of the grip support collar 88, and the grip arm 82 is swung in clockwise direction (FIG. 7) because of the associated engagements between the cam followers 94 and 96 and the corresponding cam surfaces 86a and 86b.

In the next step, as shown in FIG. 7(i), when the spindle head 24 is further lowered till the lower open end of the spindle 40 reaches the original point Z, the grip arm 82 has completely separated from the tool holder 48 inserted in and held by the tool holding member 42, thereby allowing the spindle 40 to be rotated about its axis and enabling the machining to the workpiece 91. When the spindle head 24 is further lowered with respect to the original point Z, the grip arm 82 is further moved away from the tool holder 48, as shown in FIG. 7(a), thus enabling the sole lowering of the spindle head 24 with respect to the workpiece 91. As described above, according to the embodiment of this invention, there are provided the second cam surface 86b on the cam member 86 and the second cam follower 96 on the grip arm 82, so that excessive swinging movement of the grip arm 82 in clockwise direction in FIG. 7 due to the movement of the spindle head 24 can be effectively prevented.

As described hereinabove with respect to the preferred embodiment, according to the automatic tool exchanger of the machine tool of this invention, the relative motions of the respective parts or segments required for changing the tool can be minimumly limited. The fractionization of these motions makes reduce the weights of the respective members, thus enabling the high speed operation of the machine. Accordingly, even if the spindle head is moved at a high speed, the tool can be easily changed, thus shortening the time required for the changing of the tools.

It is to be noted that this invention is not limited to the specific embodiment described herein and various changes and modifications can be made without departing from the sprit and scope of the invention.

What is claimed is:

1. An automatic tool changer for use in a machine tool for automatically changing a tool, the machine tool including a main frame, a main spindle head movably provided with respect to the main frame, a main spindle rotatably disposed in the main spindle head with the main spindle head being movable in an axial direction of the main spindle, and a tool magazine provided with a rotatable magazine base for holding a plurality of tool holders and for rotationally indexing one of the tool holders such that one of the rotationally indexed tool holders may be interchanged with a tool holder provided at the main spindle, the automatic tool changer comprising:

a plurality of tool holder gripping means radially arranged on and pivotably supported by said magazine base, said tool magazine being secured to a stationary portion of said main frame; and, means for pivoting one of said tool holder gripping means independently of the remaining tool holder gripping means, said pivoting means including a moving means for moving said one of said tool holder gripping means toward and away from said main spindle, said moving means being operative to move said one of said tool holder gripping means away from said main spindle at times when said main spindle head is moved towards a work piece for machining.

2. The automatic tool changer as defined in claim 1, wherein said tool magazine further comprises a plurality of pivot shafts radially arranged with respect to said magazine base, each of said plurality of tool holder gripping means being pivotally supported by a respective one of said pivot shafts.

3. The automatic tool changer as defined in claim 1, wherein each of said tool holder gripping means comprises a first portion, an intermediate portion, and a second portion, said first portion being in association with said magazine base for normally urging said tool holder gripping means toward said main spindle head, said intermediate portion being rotatably supported by said pivot shaft, and said second portion being provided with a bifurcated portion for gripping said tool holder.

4. The automatic tool changer as defined in claim 1, wherein said pivoting means comprises a first cam follower provided on each of said tool holder gripping means at a position in confrontation with said main spindle head; and a first cam surface provided on said main spindle head and at a position in confrontation with said tool magazine, said first cam follower being selectively engageable with said first cam surface in response to the movement of said main spindle head.

5. The automatic tool changer as defined in claim 4, wherein said first portion of said tool holder gripping means comprises a biasing means for biasing said second portion toward said main spindle head.

6. The automatic tool changer as defined in claim 4, wherein said pivoting means further comprises a second cam follower provided at said tool holder gripping means at a position in confrontation with said main spindle head, and a second cam surface provided at said main spindle head and at a position in confrontation with said tool magazine, said second cam follower being selectively engageable with said second cam surface in response to movement of said main spindle head, said second cam surface being adapted to prevent said tool holder gripping means from excessive pivotal movement to a direction away from said main spindle head against biasing force of said biasing means.

7. The automatic tool changer as defined in claim 4, wherein each of said tool holder gripping means defines a central line along longitudinal direction thereof, said first cam follower being positioned opposite to said second cam follower with respect to said central line.

8. The automatic tool changer as defined in claim 3, wherein said tool holder gripping means comprises a grip arm having said first, intermediate and second portions; and wherein each of said tool holders has a maximum diameter portion formed with annular V-shaped groove, and wherein said bifurcated portion comprises two bifurcated members each formed with a bore extending in a direction perpendicular to said grip arm; retractable pins disposed in said bores, and spring means disposed in said bores for biasing said pins, said pins being engageable with said annular V-shaped groove.

9. The automatic tool changer as defined in claim 1, further comprising: clamping and unclamping means for clamping and unclamping one of said tool holder with respect to said main spindle synchronously with an operation of said pivotting means and with the movement of said main spindle head.

* * * * *